(12) United States Patent
Villaret

(10) Patent No.: US 9,164,482 B2
(45) Date of Patent: Oct. 20, 2015

(54) COUPLING LEVER AND COUPLING DEVICE FOR A HOROLOGY MECHANISM

(71) Applicant: ROLEX S.A., Geneva (CH)

(72) Inventor: Pierre Villaret, Villy le Pelloux (FR)

(73) Assignee: ROLEX S.A., Geneva (CH)

( * ) Notice: Subject to any disclaimer, the term of this patent is extended or adjusted under 35 U.S.C. 154(b) by 62 days.

(21) Appl. No.: 13/971,517

(22) Filed: Aug. 20, 2013

(65) Prior Publication Data

US 2014/0056112 A1 Feb. 27, 2014

(30) Foreign Application Priority Data

Aug. 21, 2012 (EP) ..................................... 12181256

(51) Int. Cl.
| | | |
|---|---|---|
| *G04B 13/00* | (2006.01) | |
| *G04B 11/00* | (2006.01) | |
| *G04B 19/25* | (2006.01) | |
| *G04B 27/06* | (2006.01) | |
| *F16H 57/021* | (2012.01) | |
| *G04B 13/02* | (2006.01) | |

(52) U.S. Cl.
CPC .............. *G04B 13/00* (2013.01); *F16H 57/021* (2013.01); *G04B 11/003* (2013.01); *G04B 13/026* (2013.01); *G04B 19/25* (2013.01); *G04B 27/06* (2013.01); *Y10T 29/49579* (2015.01); *Y10T 74/19619* (2015.01)

(58) Field of Classification Search
CPC ................... G04B 27/02; G04B 11/00–11/04; G04B 13/00; G04B 13/023
USPC .................................................... 368/190–193
See application file for complete search history.

(56) References Cited

U.S. PATENT DOCUMENTS

| | | | | | |
|---|---|---|---|---|---|
| 325,536 | A | * | 9/1885 | Hart ............................... | 368/196 |
| 3,470,687 | A | * | 10/1969 | Kamijo et al. .................. | 368/32 |
| 3,837,161 | A | * | 9/1974 | Wuthrich ........................ | 368/22 |
| 3,844,107 | A | * | 10/1974 | Guyot ............................ | 368/22 |
| 3,848,400 | A | * | 11/1974 | Fluck et al. .................... | 368/193 |
| 3,874,162 | A | * | 4/1975 | Boxberger et al. ............ | 368/156 |
| 3,972,177 | A | * | 8/1976 | Vuilleumier ................... | 368/196 |
| 3,983,691 | A | * | 10/1976 | Schaller et al. ................ | 368/31 |
| 4,464,062 | A | * | 8/1984 | Inage ............................. | 368/220 |
| 2008/0259741 | A1 | * | 10/2008 | Goeller ......................... | 368/199 |

FOREIGN PATENT DOCUMENTS

| | | |
|---|---|---|
| CH | 302210 A | 10/1954 |
| CH | 703697 A2 | 3/2012 |

(Continued)

OTHER PUBLICATIONS

European Search Report of EP12181256, mailing date of Jan. 30, 2013, with partial English translation.

*Primary Examiner* — Amy Cohen Johnson
*Assistant Examiner* — Jason Collins
(74) *Attorney, Agent, or Firm* — Westerman, Hattori, Daniels & Adrian, LLP

(57) ABSTRACT

Lever (6) comprising at least a first element (61) for guiding in rotation of a first wheel (1), at least one friction element (62) which is designed to co-operate with an at least substantially cylindrical portion (10c) of the first wheel, and at least one resilient element (63), which is designed to return resiliently the at least one friction element to a state of co-operation with the said portion of the first wheel, notably in contact with the said portion of the first wheel.

25 Claims, 7 Drawing Sheets

(56) References Cited

FOREIGN PATENT DOCUMENTS

DE 2853888 A1 11/1979
EP 0069814 A2 1/1983
EP 1925996 A1 5/2008
GB 870989 A 6/1961

* cited by examiner

XII-XII

COUPLING LEVER AND COUPLING DEVICE FOR A HOROLOGY MECHANISM

The invention relates to a horology pivoting unit or lever. It also relates to a coupling device or clutch device, in particular a one-way coupling device designed to couple a first gear train to at least a second gear train, the device comprising a lever of this type. Finally, it relates to a horological movement or a horology piece or timepiece, in particular a watch, comprising a lever of this type or a coupling device of this type.

One-way coupling devices which are designed to couple a first gear train to at least a second gear train of a horological movement are known. Devices of this type are known particularly in mechanisms for correction or winding of a horological movement.

"One-way coupling device" means a device that usually comprises two transmission wheels, one of which drives and the other one of which is driven, which are rendered integral in one direction of rotation and separated in the other direction. For this purpose, a degree of freedom with which the drive wheel is provided makes it possible to vary the distance between the centres of the two wheels, and thus to create the engagement or meshing of the driven wheel according to the direction of rotation of the drive wheel. Solutions are known according to which the drive wheel, which is optionally coupled to a coupling spring, is pivoted within a cut-out or on a lever, such as to displace its axis of pivoting relative to that of the driven wheel. However, these designs are not optimum in terms of their reliability, strength, dimensions, or their assembly mode.

Patent application EP1925996A1 discloses a one-way coupling device which is used in a mechanism for rapid correction of two calendar indications. This device is formed by an intermediate correction wheel driven by a winding mechanism rod, which is engaged with a sliding correction pinion arranged in a curved oblong cut-out. Thus, the sliding pinion can go from a first stable position for correction of a first display unit, to a second stable position for correction of a second display unit, according to the direction of rotation of the winding mechanism rod. A solution of this type has the advantage of requiring few components. However, it is dependent on a consequent number of assembly plays. Thus, the axial and radial clearance of the corrector pinion is particularly problematic to control. Consequently, the pivoting torque of the sliding pinion is variable, to the extent that its pivot is liable not to be displaced under the effect of the inversion of the direction of rotation of the winding mechanism rod, and not to permit one or the other of the two correction functions.

One solution consists of adding a coupling spring, or friction spring, to the sliding pinion, in order to guarantee torque which is sufficient to permit the displacement of the sliding opinion by torque effect, by means of its direction of rotation. This solution has the advantage of generating torque on the corrector independently of the manner in which it is pivoted. However, it does not make it possible to guarantee the axial and radial positioning of the corrector relative to its environment. In addition, this coupling device has the disadvantage of being large, and not being able to be assembled independently from a substantial number of components of the movement of the horology piece. Thus, this coupling device can be tested and validated only once the movement mounting procedure is well underway.

One solution consists of making a corrector pinion pivot on a coupling lever, the axis of rotation of which coincides with that of the wheel which is engaged with this corrector pinion. Thus, the radial and axial clearance of this pinion is controlled by assembly means which constitute the coupling lever. Application CH703697A2 discloses a correction device in which the correctors are pivoted on a lever of this type. The document specifies that it is the frictions which intervene between this lever and one of the correction wheels which make it possible to take the lever into one or the other of these extreme correction positions, according to the direction of rotation of the corrector. However, it appears that the conventional assembly means do not make it possible to control the frictions suitably, to the extent of making a coupling device of this type reliable. Consequently, the pivoting torques of the correctors are variable, to the extent that the pivots are liable not to be displaced under the effect of the inversion of the direction of rotation of the winding mechanism rod, and not to permit one or the other of the two correction functions.

One solution thus consists of arranging a metal friction foil at the axis of pivoting of the corrector, such as to retain the latter against the lever, by imparting to it an axial support force, and thus guaranteeing adequate friction between the lever and the corrector. Although this solution makes it possible to eliminate the above-described disadvantages, it nevertheless appears to lack robustness in relation to the production tolerances inherent in this type of spring, the number of parts which intervene within this assembly, and the assembly tolerances, which must be particularly stringent as a result of the mounting mode of this spring.

Document U.S. Pat. No. 325,536 discloses a device for the implementation of a winding mechanism in which the axis of pivoting of a ratchet drive wheel is guided on a coupling lever, and braked by a friction spring which applies a radial force to it. More particularly, an annular receipt surface formed on the lever is designed to guide in rotation a cylindrical pivoting portion of the ratchet drive wheel, whereas a leaf spring, produced integrally with the lever, is designed to place this cylindrical portion of the ratchet drive wheel against the said receipt surface. Rotation of the winding mechanism rod in a first direction of rotation induces the rotation of the ratchet by driving the ratchet drive wheel, and thus coiling the barrel spring. In this configuration, the ratchet drive wheel is guided by the receipt surface of the lever, under the effect of the leaf spring. In a second direction of rotation of the winding mechanism rod, the leaf spring bends under the effect of the inversion of the direction of rotation of the ratchet drive wheel, such that the latter is released from the ratchet. In this configuration, the ratchet drive wheel is no longer in contact with the receipt surface of the lever, and its guiding in rotation is thus diminished. In addition, the release of the winding mechanism is not generated by the rotation of the coupling lever, but by the bending of the leaf spring, thus providing the ratchet drive wheel with a degree of freedom.

According to the prior art, there is no simple solution which makes it possible to propose a one-way coupling device, the drive wheel of which, for example a corrector pinion, is pivoted such that its guiding, as well as its pivoting torque, are perfectly controlled. In addition, there is no simple solution which makes it possible to optimize, and in particular to increase, the resistant or resistive torque which opposes the pivoting of the drive wheel in order to guarantee the satisfactory functioning of the one-way coupling device.

The object of the invention is to provide a lever which makes it possible to eliminate the above-described disadvantages, and to improve the levers known in the prior art. In particular, the invention proposes a lever which makes it possible to provide in a simple, reliable and robust manner, a one-way coupling device, notably for a correction or winding mechanism.

A lever according to the invention is defined by Claim 1.

Different lever embodiments are defined by Claims 2 to 11.

In the different embodiments and/or variants, at least one support surface for the at least one friction element can be provided by a flank portion of the slot.

In the different embodiments and/or variants, at least one friction element can comprise at least one support surface, and notably two or three or four support surfaces, and notably at least one localized support surface, and notably two or three or four localized support surfaces.

In the different embodiments and/or variants, the lever can comprise two support surfaces, at least one of the support surfaces being at least globally concave in order to match the form of the first wheel, and notably the form of the at least substantially cylindrical portion of the first wheel.

In the different embodiments and/or variants, the at least one resilient element is preferably made of:

steel, and in particular Durnico steel; or
$CuBe_2$ alloy; or
nickel or nickel-phosphorus; or
silicon.

A coupling device is defined by Claim 12 or by Claim 13 or by Claim 14.

An embodiment of a coupling device is defined by Claim 15.

A movement is defined by Claim 16.

A horology piece is defined by Claim 17.

The invention also relates to a use of such a lever in a coupling device.

The appended drawings represent by way of example three embodiments of a lever according to the invention.

Figure 1:
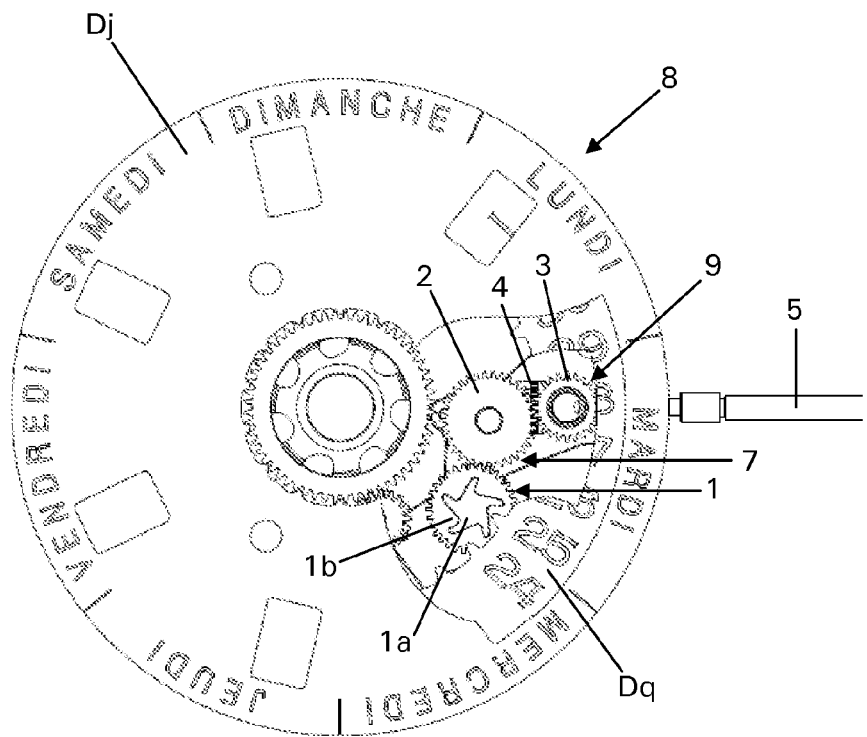
FIGS. 1 and 2 are plan views of a first embodiment of a horology movement comprising a first embodiment of a coupling device provided with a first embodiment of a lever according to the invention.

A first embodiment of a horology movement 8 according to the invention is described hereinafter with reference to FIGS. 1 and 2. The movement preferably comprises a calendar corrector mechanism 9, which is designed for example to correct the indications of the date and the day of the week.

The corrector mechanism can comprise a correction wheel or mobile element or mobile unit 1 acting as a drive wheel which can engage or mesh selectively with two driven wheels in order to provide two distinct one-way coupling devices. This correction wheel is an integral part of a kinematic correction chain which is driven by the rotation of a control rod 5 of a conventional calendar movement, when the latter is positioned in a predefined axial position, via a coupling device 7.

The kinematic correction chain is constituted by a control pinion 4 which is integral in rotation with the control rod 5 of an intermediate setting wheel 3, and an intermediate correction setting wheel or mobile element or mobile unit 2 which is engaged with the correction wheel 1. The wheel 1 comprises a first shaft 11. The wheel 2 rotates around a second shaft 21.

This correction wheel 1 can go from a first stable position, for correction of the dates 10, to a second stable correction position, for indication of the days 100, according to the direction of rotation of the rod 5. More particularly, when the rod is driven clockwise, a dates corrector 1a of the correction wheel 1 is positioned such that its toothing can drive a toothing of a dates disc Dq. When the rod is driven anticlockwise, a correction wheel 1b of the wheel 1 is positioned such that its toothing can drive the kinematic correction chain for indication of the days, in order to rotate the days disc Dj.

Figure 2:
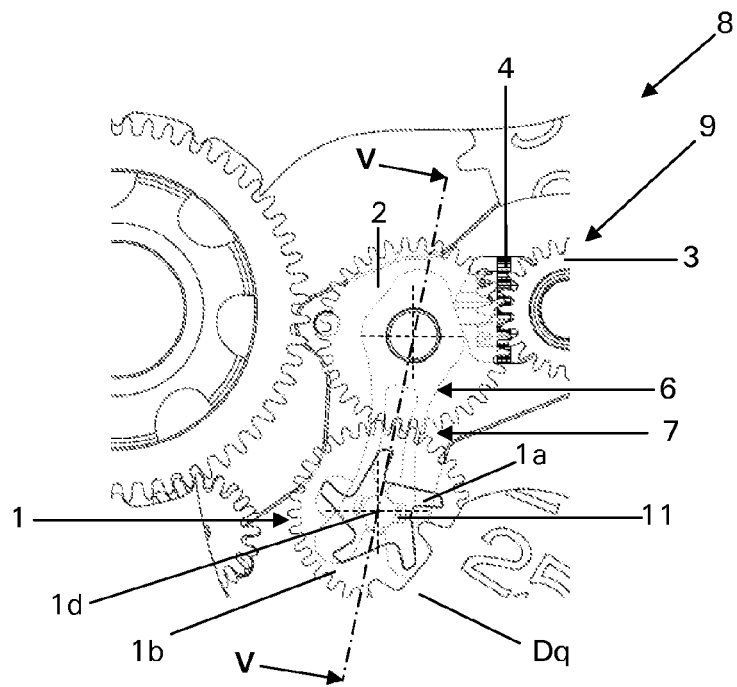
Figure 3:
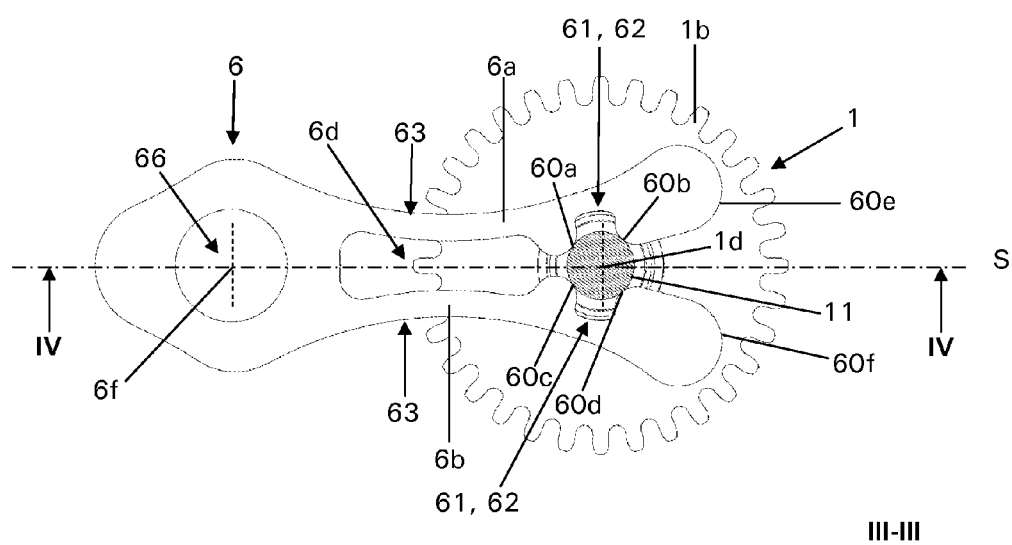
FIG. 3 is a view in cross section of the first embodiment of a lever according to a plane III-III in FIG. 4.
Figure 4:
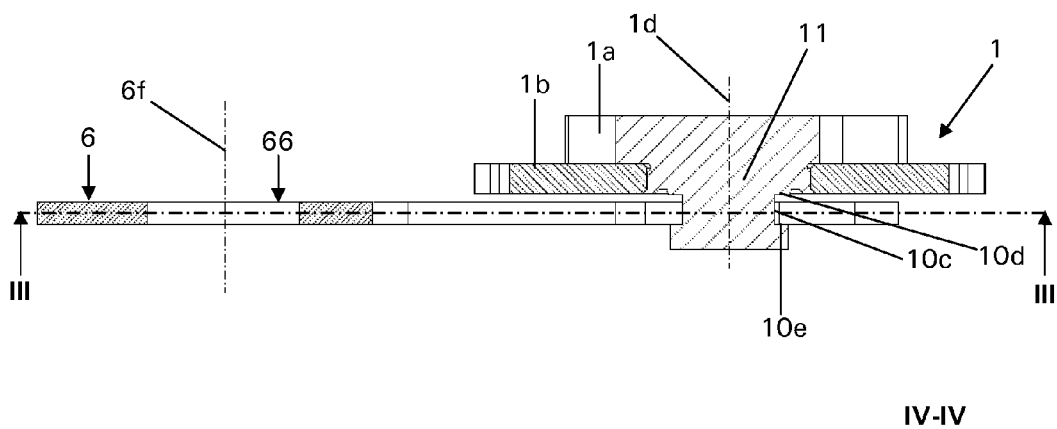
FIG. 4 is a view in cross section of the first embodiment of the lever according to a plane IV-IV in FIG. 3.
Figure 5:
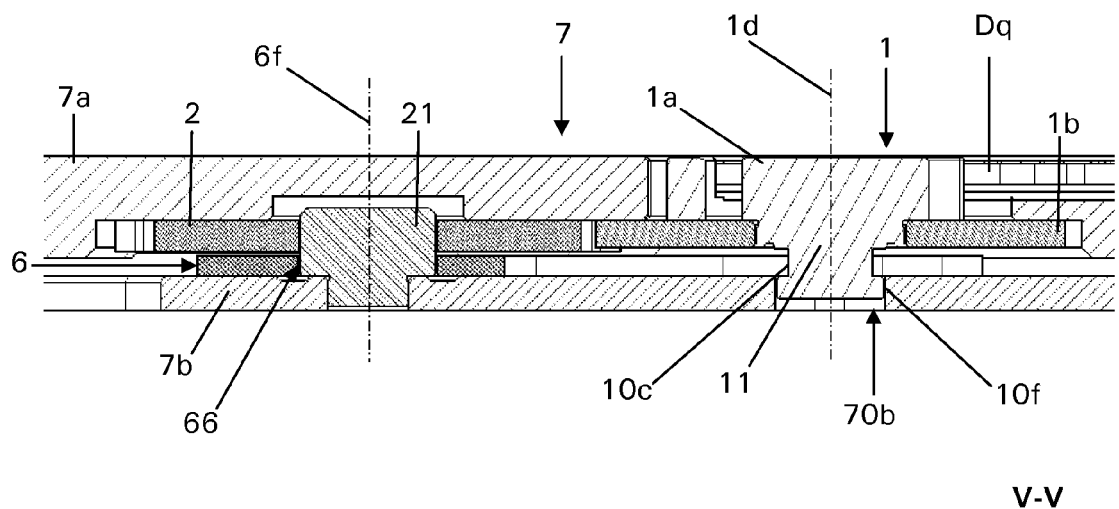
FIG. 5 is a view in cross section of the first embodiment of the coupling device according to a plane V-V in FIG. 2.

According to a preferred embodiment represented in FIGS. 1 and 2, the correction wheel 1 is pivoted on a coupling lever 6 which is designed to combine the functions of a coupling lever, or horizontal coupling lever, and also that of a friction spring.

More particularly, this lever is formed such as to pivot the wheel 1, whilst imparting to it a radial or substantially radial clamping force, which, as a result of a friction phenomenon, creates a braking or friction torque which opposes the rotation of the correction wheel 1 relative to the lever, and thus rotates this lever.

As represented in FIGS. 3 to 6, the lever 6 comprises at least a first element 61 for guiding in rotation of the first wheel 1, notably the correction wheel 1, and in particular the first shaft 11 of the first wheel 1, at least one friction element 62 which is designed to co-operate with an at least substantially cylindrical portion 10c of the first wheel, and in particular of the first shaft 11 of the first wheel, and at least one resilient element 63, which is designed to return resiliently the at least one friction element to a state of co-operation with the portion of the first wheel, notably in contact with the portion of the first wheel.

The at least one friction element applies at least one radial or substantially radial force on the portion of first shaft of the first wheel, in order to produce the braking or friction torque which opposes the rotation of the correction wheel 1 relative to the lever.

In the first embodiment, the element for guiding in rotation and the at least one friction element are combined.

The lever 6 is provided with two resilient arms 6a, 6b, which, once they have been resiliently deformed, are designed to receive the first shaft 11 of the correction wheel 1 and to define its axis of pivoting 1d. The arms preferably extend longitudinally as far as an end of the lever. The arms are separated from one another by an opening 6d, in particular an opening in the form of a slot, and notably an opening which opens out in the form of the slot. This opening 6d makes it possible to receive the first shaft 11. This opening preferably extends from the aforementioned end. Each of the two resilient arms comprises at least one support surface 60a, 60b, 60c, 60d which is designed to co-operate with the cylindrical portion 10c of the shaft 11. Preferably, each of the two resilient arms comprises at least one support surface 60a, 60b, 60c, 60d which is designed to co-operate in a localized manner with the cylindrical portion 10c of the shaft 11 (i.e. according to a point of contact or according to a surface with a limited area). Thus, the axis of rotation 1d of the wheel 1 is advantageously defined in an unequivocal manner by at least two support surfaces which are designed to co-operate in a localized manner (i.e. according to a point of contact) with the cylindrical portion 10c of the shaft 11. Preferably, there are two support surfaces 60a, 60b, 60c, 60d on each of the resilient arms 6a, 6b. The support surfaces are for example bosses provided on the arms, but they can also be combined with the arms. In other words, the support surfaces have for example a negative radius of curvature on the side of the opening 6d which is substantially distinct from the radius of curvature of the arms. The radii of curvature of the support surfaces can also be combined with the radii of curvature of the arms. Alternatively, the support surfaces can be straight, i.e. they can have an infinite radius of curvature. Also alternatively, the support surfaces can have a positive radius of curvature. The support surfaces of each of the arms are for example symmetrical with one another relative to an axis of symmetry S of the opening 6d in the lever 6. The resilient arms 6a, 6b are for example symmetrical with one another relative to the axis of symmetry S of the opening 6d in the lever 6. Preferably, this symmetry is maintained irrespective of the degree of opening of the arms 6a, 6b. Thus, the axis of rotation 1d of the wheel 1 is defined unequivocally, irrespective of the variations of diameter of the cylindrical portion 10c of the shaft 11, and thus of the resilient deformation of the arms 6a, 6b. This definition is obtained by the geometry of the arms and the support surfaces, which co-operate by contact on the cylindrical portion 10c. This definition is such that the axis 1d is positioned in the appropriate location, permitting satisfactory functioning of the meshing of the correction wheel 1 with the intermediate correction setting wheel 2. Thus, the distance between the centres between the wheels 1 and 2 is determined independently from the variations of diameter of the cylindrical portion 10c of the shaft 11. The clamping torque of the cylindrical portion 10c is, for its part, controlled by the resilient properties and the pre-coiling of the arms 6a and 6b.

Advantageously, each of the ends 60e, 60f of the respective resilient arms 6a, 6b is formed such as to permit the engagement of the shaft 11 of the wheel 1 in the opening 6d in the lever 6, and in particular the engagement of the portion 10c of shaft in the opening 6d in the lever 6, and thus permit the co-operation of the support surfaces 60a, 60b, 60c, 60d with the shaft 11, whilst pre-coiling adequately the arms 6a and 6b of the spring 6. Notably, the two ends form a "V", thus permitting the engagement of the first wheel by deforming the arms resiliently. The ends of the arms can be rounded for this purpose.

Preferably, the portion 10c of the shaft 11 which is in contact with the support surfaces 60a, 60b, 60c, 60d is delimited by bearing surfaces 10d, 10e, which retain the correction wheel 1 axially. Thus, this correction wheel 1 can be preassembled on the lever 6 before the movement is mounted, and can be guided by a frame 7a, 7b of the horology movement, after being mounted in the movement. According to a variant embodiment, the bearing surfaces 10d, 10e can also define an axial clearance of the correction wheel 1 during functioning.

In this first embodiment, an opening 66, notably a bore, formed in the lever 6, is also provided such as to guide the lever radially, and to pivot it around an axis of rotation 6f which coincides with that of the intermediate correction setting wheel 2. Thus, the lever comprises a second element 66 for guiding in rotation of the lever around the second shaft 21.

In this first embodiment, the lever comprises two guiding elements 61, i.e. a guiding element on each of the arms. Each guiding element comprises for example two bosses, the support surfaces 60a, 60b, 60c, 60d of which are designed to co-operate by contact with the cylindrical portion 10c. Preferably, the support surfaces 60a, 60b, 60c, and 60d are designed to co-operate by means of localized contact with the cylindrical portion 10c. Thus, by means of these contacts, the shaft 11 of the first wheel 1 can be guided in rotation around the axis 1d.

In this first embodiment, the lever comprises two friction elements 62, i.e. a friction element 62 on each of the arms. Preferably, each friction element comprises two bosses, the support surfaces 60a, 60b, 60c, and 60d of which are designed to co-operate by contact with the cylindrical portion 10c. The friction elements are provided on the flanks of the slot, and in particular the support surfaces of the friction elements are provided by flank portions of the slot. Each friction element comprises two support surfaces 60a, 60b, and 60c, 60d. At the contacts, radial or substantially radial forces are applied to the cylindrical portion 10c. When the wheel 1 is rotated, these forces create a mechanical friction torque which opposes the rotation of the wheel 1. The intensity of this torque is determined by the coefficient of friction of the support surfaces on the portion 10c, and by the intensity of the forces exerted. This intensity of the forces is itself determined by the at least one resilient element 63 which is designed to return resiliently the at least one friction element in contact with the portion 10c of the first shaft 11.

In this first embodiment, the lever comprises two resilient elements 63 which are designed to return resiliently the at least one friction element in contact with the portion 10c of the first shaft. Thus, each resilient element comprises an arm 6a, 6b. As previously described, the arms are delimited by flanks of the slot. It will be appreciated that the geometries of the arms 6a, 6b are defined such as to generate stresses which are admissible and minimized for the material which constitutes them. The thickness and the form of these arms 6a, 6b are defined for example further to optimization carried out by means of a digital simulation program such as ANSYS.

The arms are constituted by any appropriate material, such as steel, for example Durnico steel, i.e. a steel with nickel, cobalt and molybdenum, or $CuBe_2$. They can also be constituted for example by nickel, nickel-phosphorus, or silicon. These arms can be produced for example by means of conventional machining techniques such as stamping or wire or laser cutting. They can also be produced by means of well-known micro-production techniques such as the UV-LIGA or DRIE processes, for example.

In the first embodiment, the lever 6 is preferably in a single piece. "In a single piece" means that the lever 6 is produced in one piece. The entire lever is thus made of the material which constitutes the arms. The lever can therefore be made as described in the preceding paragraph. The lever is in this case preferably made of resilient material, and can be designated as a spring.

Preferably, the lever 6 is flat. However, it is conceivable to implement a stepped lever, such as to optimize the resilience of the arms 6a, 6b in a given constructive context.

In the first embodiment described, the lever thus comprises two friction elements each comprising two support surfaces 60a, 60b, 60c, 60d. The lever therefore comprises four support surfaces. It will be appreciated that according to variant embodiments, the number of these support surfaces can be different. Notably, the lever can have three support surfaces, or two support surfaces, or a single support surface. In this last case, another means is provided in order to ensure the guiding in rotation of the first shaft.

In the first embodiment described, the lever comprises two guiding elements, each comprising two support surfaces 60a, 60b, 60c, 60d. The lever thus comprises four support surfaces which provide the guiding. It will be appreciated that in variant embodiments, the number of these support surfaces can be different. Notably the lever can have three support surfaces, or two support surfaces. In this last case, at least one of the two support surfaces has a form which is at least globally concave in order to match the form of the first shaft. Also in this case, the two support surfaces are diametrically opposite, or substantially diametrically opposite, at least a first point of a first support surface being diametrically opposite a second point of the second support surface.

It is understood that the above-described embodiments of the lever are non-limiting. In addition, it will be appreciated that the number of support surfaces of the arms which are in contact with the shaft 11 of the correction wheel 1, and the geometry of the lever and of the arms, can be modified. Notably, the arms need not be symmetrical. In particular, the number of support surfaces on each of the arms can be different.

Preferably, the lever does not comprise either the first wheel and the second, or the first axis of the first wheel and the second axis of the second wheel.

As represented in FIGS. 1, 2, 5 and 6, an embodiment of a coupling device 7 comprises the lever 6 as previously described, the first wheel 1 and the second wheel 2. The first shaft is integral with the remainder of the first wheel 1 and the second wheel, such that the lever rotates around the second shaft. "Integral with" means notably "connected in rotation with" or "secured on" or "in embedded connection with". The first wheel can be engaged directly with a third wheel of a first kinematic chain, and notably with a kinematic chain for correction of the dates disc Dq, or with a fourth wheel of a second kinematic chain, and notably with a kinematic correction chain of the days disc Dj, according to the coupling state, and in particular according to the position of the lever. In fact, in a first position of the lever, the first wheel is a drive wheel which drives a first kinematic chain, and in a second position of the lever, the second wheel is a drive wheel which drives a second kinematic chain.

Figure 6:
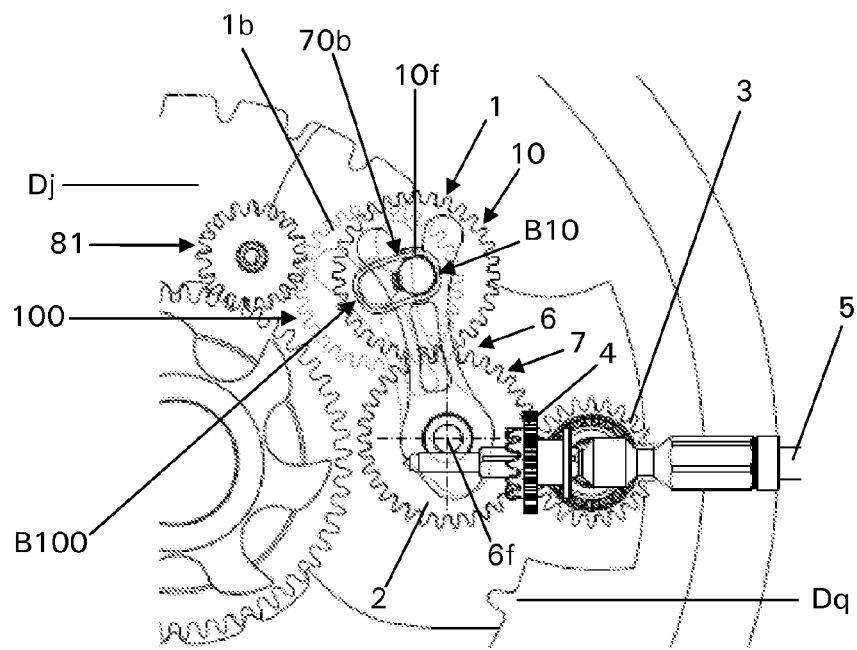
FIG. 6 is a view from below of the first embodiment of the horology movement.

Thus, the lever 6 acts as a horizontal coupling lever for each of the correction devices of the horology movement 8. When the rod 5 is turned clockwise, seen from the rear of the watch dial, the correction wheel 1 rotates anticlockwise, such that a torque is transmitted to the lever in order to make it rotate clockwise around its axis 6f, thus engaging the corrector 1a with the toothing of the dates disc Dq, as represented in FIG. 6. This stable position 10 for correction of the dates can be defined by a portion 10f of the axis 11 of the wheel 1 which comes into contact against a stop B10 of the frame 7b of the horology movement.

When the rod is rotated anticlockwise, seen from the rear of the watch dial, a torque is transmitted to the lever in order to make it rotate anticlockwise around its axis 6f, thus engaging the correction wheel 1b of the wheel 1 with a days corrector wheel 81 which drives the days disc Dj clockwise. This stable correction position 100 for indication of the days is defined by the portion 10f of the axis 11 which comes into contact against a stop B100 of the frame 7b of the horology movement.

Advantageously, an oblong opening 70b which is designed to co-operate with the portion 10f of the shaft 11 of the wheel 1 can be formed in the frame 7b of the horology movement, such as to optimize the radial guiding of the correction wheel 1.

As a variant, the lever 6 can be provided with an arm 600, a flank 600a, and notably an end 600a of which is designed to be actuated by an additional control mechanism in order to release the correction wheel 1 from the dates disc Dq or from the days corrector wheel 81, when the latter can be actuated by a connected adjustment device, and notably a mechanism for setting the time. Thus, a configuration of this type makes it possible to increase substantially the resistive torque which opposes the pivoting of the correction wheel, in order to guarantee the satisfactory functioning of the one-way coupling device, without however detracting from a connected time information adjustment device, and notably a mechanism for setting the time which can drive the days corrector and/or the dates disc, which are potentially engaged with a correction wheel 1 on which the torque acts.

Figure 7:
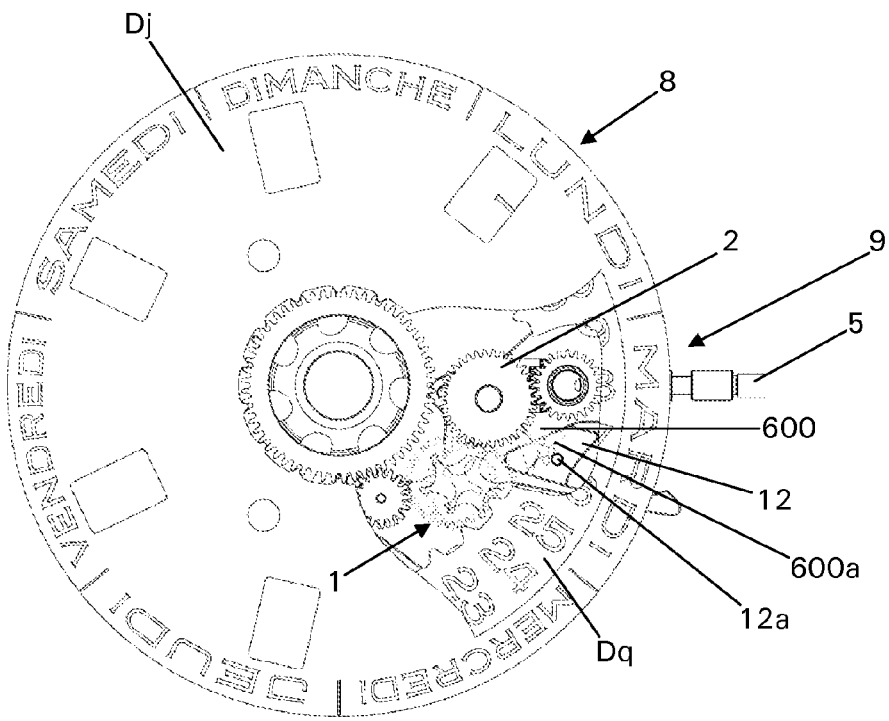
FIG. 7 is a plan view of the first embodiment of the horology movement comprising the first embodiment of the lever device provided with a variant of the first embodiment of a lever according to the invention.
Figure 8:
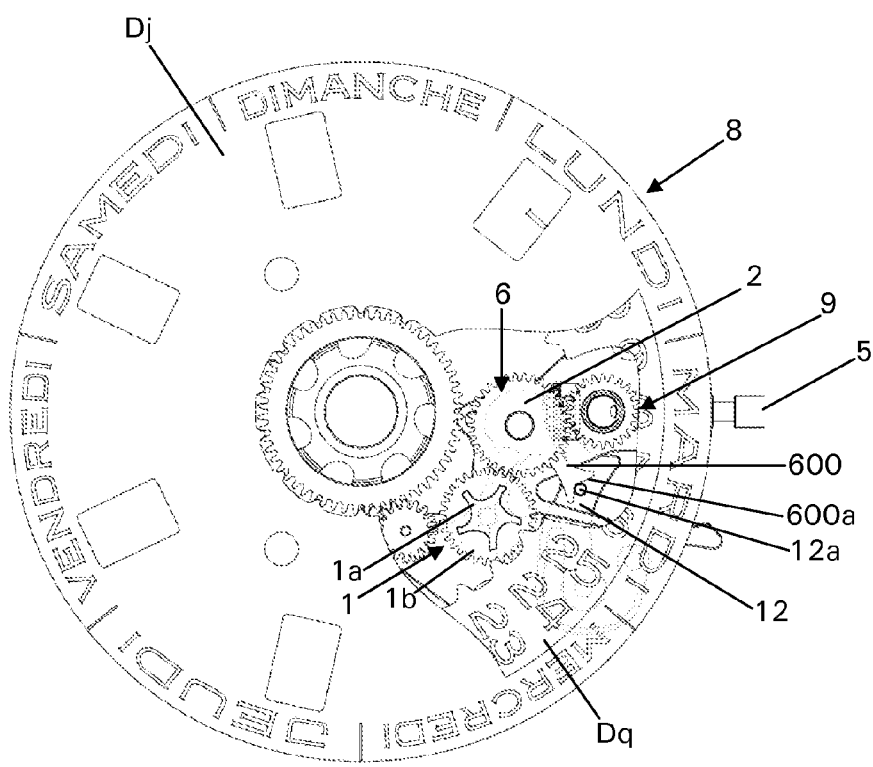
FIG. 8 is a plan view of the first embodiment of the horology movement comprising the first embodiment of the coupling device provided with a variant of the first embodiment of a lever according to the invention, the coupling lever being blocked in a neutral angular position.
Figure 9:
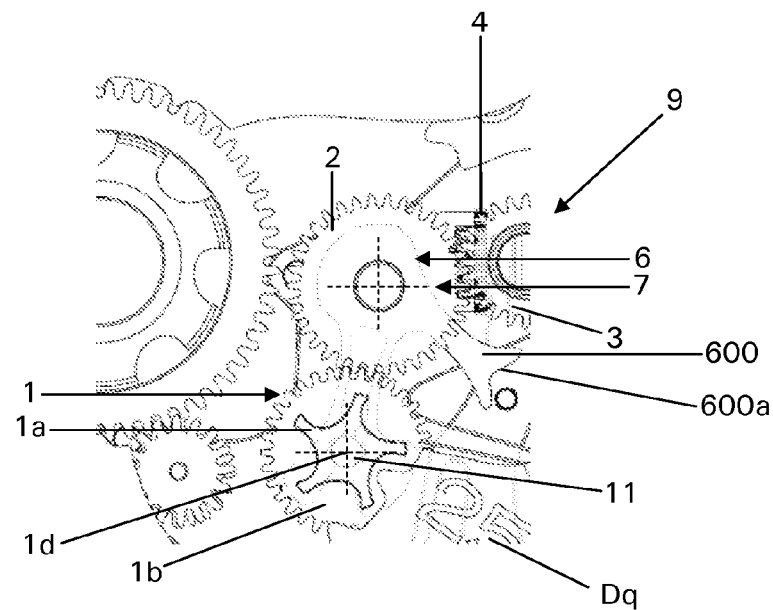
FIG. 9 is a detail view of the first embodiment of the horology movement comprising the first embodiment of the coupling device provided with a variant of the first embodiment of a lever according to the invention, the coupling lever being positioned in a correcting position of the horology movement.
Figure 10:
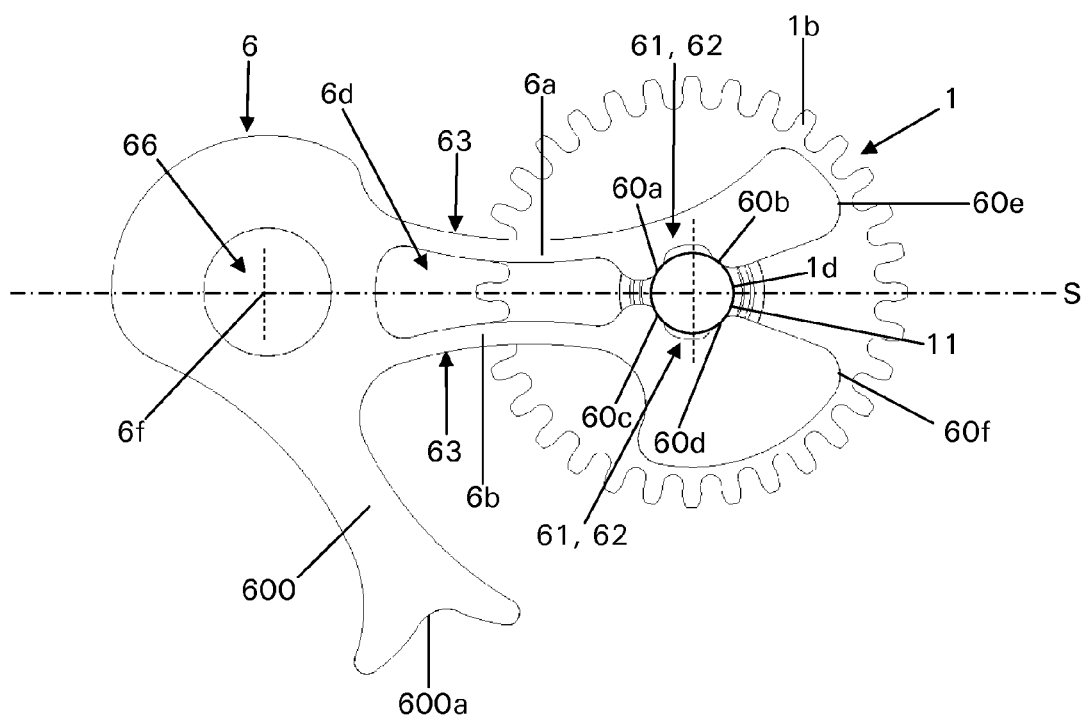
FIG. 10 is a view of a variant of the first embodiment of the lever according to the invention.

FIGS. 7, 8, 9 and 10 illustrate a variant of this type of the first embodiment of a lever according to the invention. As represented in FIG. 7, the coupling lever 6 is free to oscillate between the correction positions 10 and 100. For this purpose, the end 600a of the arm 600 is released from contact with the pin 12a supported by the lever 12 of the additional control mechanism, which is controlled notably by the translation of the rod. FIG. 8 illustrates the coupling lever blocked in a neutral position by the additional control mechanism. For this purpose, the end 600a of the lever 6 can abut the pin 12a, irrespective of the direction of rotation of the lever 6. Thus, the wheel 1 is positioned such that the corrector 1a is out of reach of the dates disc Dq, and the wheel 1b is out of reach of the days corrector wheel. The arms 600 can also make it possible to immobilize the lever in another position, and notably a position in which the wheel(s) supported by the lever engage(s) with other elements.

In this first embodiment, notably in this variant of the first embodiment, the torque which is resistive to the pivoting of the correction wheel 1 and is produced by the friction elements 61, 62, is more than 2, 3, or 5, or 6 times the torque which is resistive to the pivoting of the correction lever around the axis of rotation 6f.

A second embodiment of a lever 6' is described hereinafter with reference to FIGS. 11 and 12. This second embodiment differs from the first embodiment in that the lever comprises a body 64' and a component 65' which is added onto the body. This component comprises at least one friction element 62' and at least one resilient element 63'. Preferably, the friction elements and/or the resilient elements are only present on the component 65'. In the figures which illustrate this second embodiment, a "'" has been added to the numerical references which designate the elements which are identical to, or provide the same functions as in the first embodiment. Thus, for example, the first wheel with the reference "1" in the first embodiment has the reference "1'" in the second embodiment. In the second embodiment, the component also comprises at least one element 61' for guiding in rotation of the first shaft.

Thus, in this second embodiment, the lever combines:
a component, notably a component of the spring type, which provides guiding in rotation of the first shaft, and friction by generating radial clamping of the shaft of the wheel 1'; and
a conventional horizontal coupling lever body.

This permits distribution of the functions of the lever on the body of the lever and on the component, and therefore makes it possible to adapt in the best possible way to a given construction context.

For example, the component 65' can be embedded in, or secured on, or mounted integrally with the body of the lever 64'. As in the first embodiment, the geometries of the arms 6a', 6b' are formed such as to define the axis of rotation 1d' of the first wheel 1', whilst providing an adequate clamping torque of its shaft 11', in order to obtain a required friction torque.

However, the pivoting of the lever 6' on the plane is carried out by means of the interposition of the body of the lever 64' around an axis of rotation 6f'. This pivoting and this axis are defined by an opening 66', and notably a bore, provided in the body of the lever 64'. The axis thus defined coincides with that of the intermediate setting wheel 2' which is engaged with the drive wheel 1'.

Figure 11:
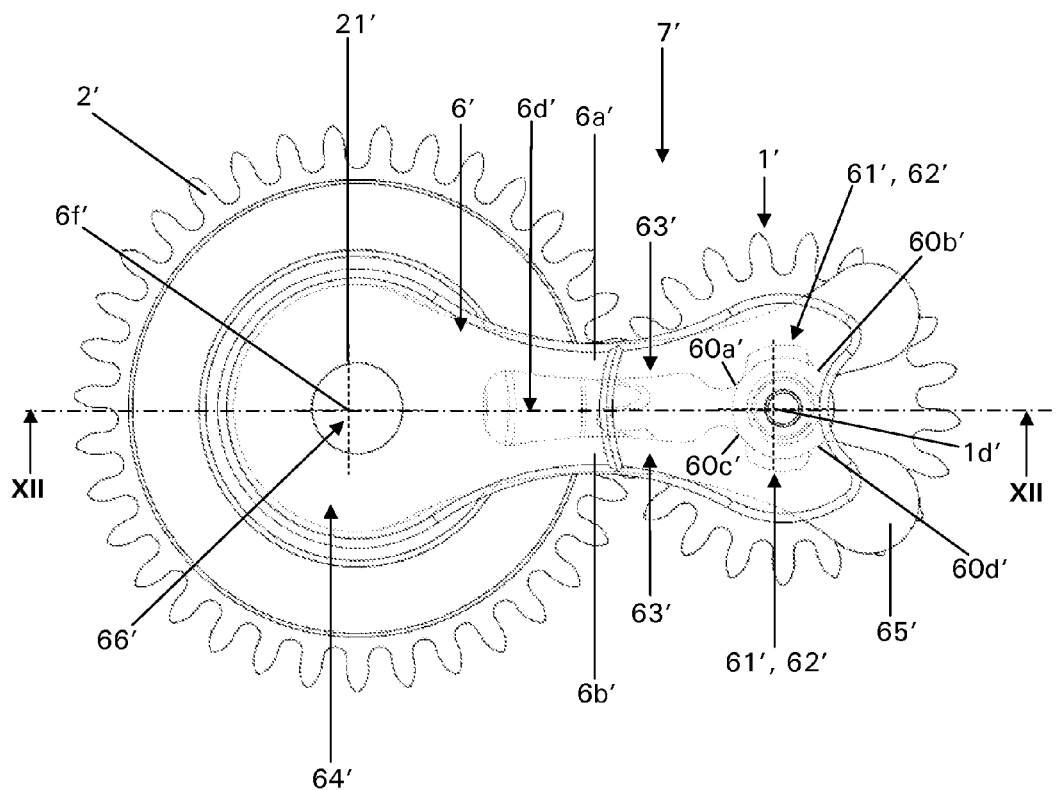
FIG. 11 is a view of a second embodiment of a lever according to the invention.
Figure 12:
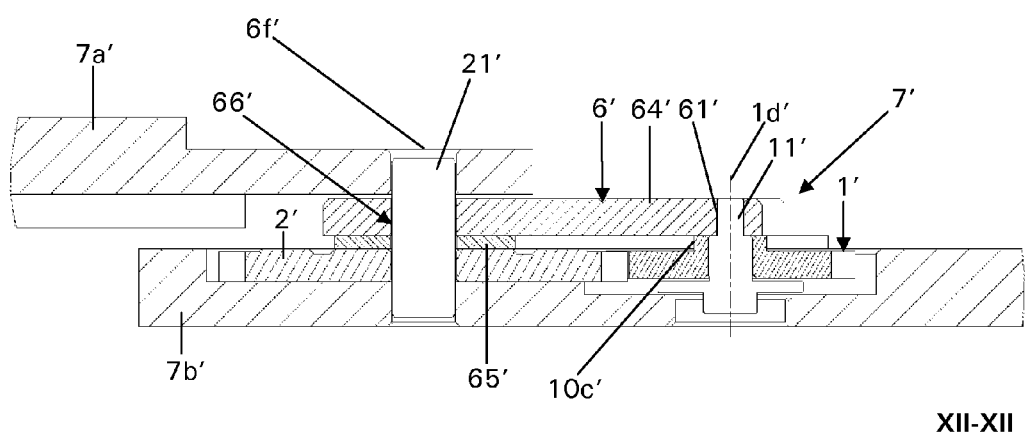
FIG. 12 is a view in cross section of the second embodiment of a lever according to the invention, according to a plane XII-XII in FIG. 11.

As represented in FIGS. 11 and 12, an embodiment of a coupling device 7' comprises the lever 6' as previously described, the first wheel 1' and the second wheel 2'. The first wheel can engage directly with a third wheel of a first kinematic chain, or optionally with a fourth wheel of a second kinematic chain, according to the state of the coupling, and in particular according to the position of the lever. In fact, in a first position of the lever, the first wheel is a drive wheel which drives a first kinematic chain, and in a second position of the lever, the first wheel is a drive wheel which can drive a second kinematic chain.

As for the first embodiment, the lever 6' can be provided with an arm, a flank of which, and notably an end, which is designed to be actuated by an additional control mechanism in order to release the wheel 1' from the third wheel or from the fourth wheel, when the latter can be actuated by a connected adjustment device. The arm can also make it possible to immobilize the lever in another position, and notably a position in which the wheel(s) supported by the lever engage(s) with other elements. In this second embodiment, the torque which is resistive to the pivoting of the correction wheel 1' and is produced by the friction elements 61', 62', is more than 2, 3, or 5, or 6 times the torque which is resistive to the pivoting of the correction lever around the axis of rotation 6f'.

A third embodiment of a lever 6" is described hereinafter with reference to FIGS. 13 and 14. This third embodiment differs from the second embodiment in that the element for guiding in rotation of the first shaft 11" of the first wheel 1" is provided on the body of the lever 64", and not on the component 65". The component comprises at least one friction element 62" and at least one resilient element 63". Preferably, the friction elements and/or the resilient elements are present only on the component. In the figures which illustrate this third embodiment, a """ has been added to the numerical references which designate the elements which are identical to, or provide the same functions as in the first embodiment. Thus, for example, the first wheel with the reference "1" in the first embodiment has the reference "1"" in the third embodiment.

Thus, the axis of rotation 1d" of the drive wheel 1" is defined by the body of the lever 64". In fact, a bore 61" makes it possible to guide the shaft in rotation around the axis 1d". On the other hand, the friction torque which opposes the free rotation of the first wheel 1" is defined by the component 65". In fact, as illustrated in FIGS. 13 and 14, arms 6a", 6b" are placed at support surfaces 60a" and 60b" which are combined with the arms 6a", 6b" on the portion 1c" of the shaft 11". Just as in the preceding embodiment, the rotation of the lever 6" on the plane is carried out by means of the interposition of the body of the lever 64", the axis of rotation 6f" of which is defined by an opening 66", and notably a bore, provided in the body of the lever 64". This axis coincides with that of the setting wheel 2", which is engaged with the drive wheel 1".

Figure 13:
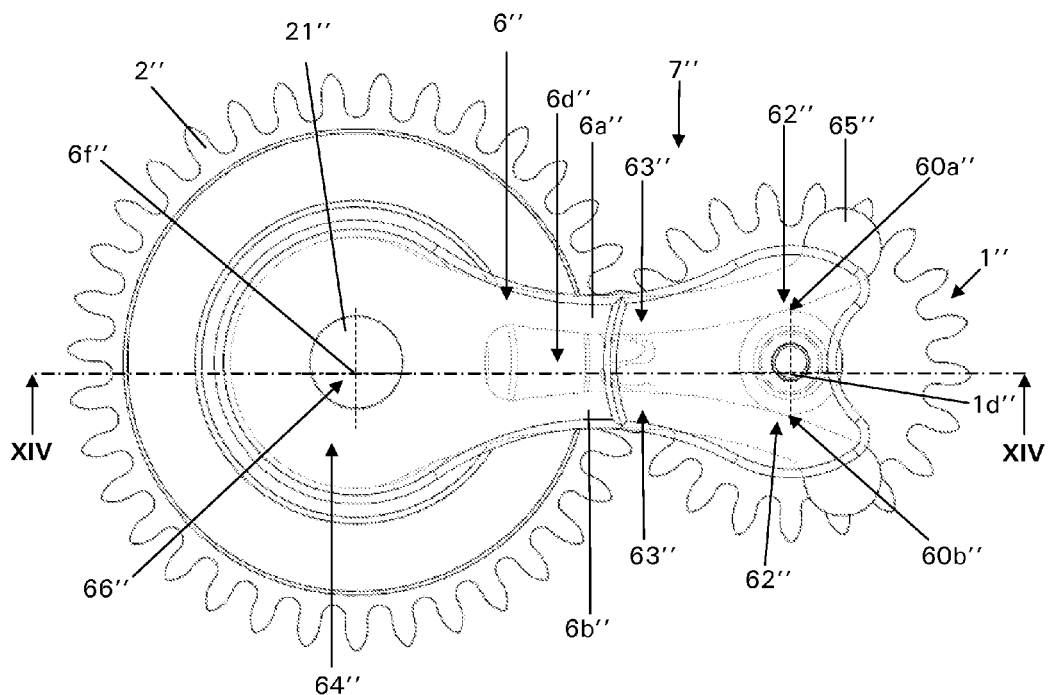
FIG. 13 is a view of a third embodiment of a lever according to the invention.
Figure 14:
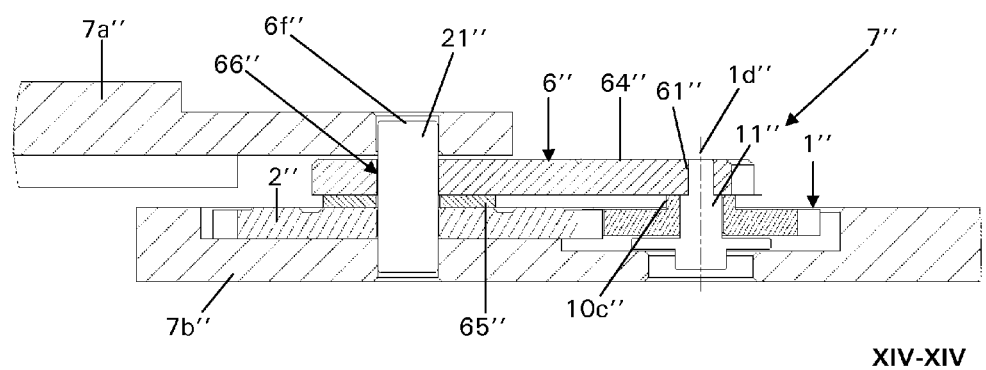
FIG. 14 is a view in cross section of a third embodiment of a lever according to the invention, according to a plane XIV-XIV in FIG. 13.

As represented in FIGS. 13 and 14, an embodiment of a coupling device 7" comprises the lever 6" as previously described, the first wheel 1" and the second wheel 2". The first wheel can engage directly with a third wheel of a first kinematic chain, or optionally with a fourth wheel of a second kinematic chain, according to the state of the coupling, and in particular according to the position of the lever. In fact, in a first position of the lever, the first wheel is a drive wheel which drives a first kinematic chain, and in a second position of the lever, the first wheel is a drive wheel which can drive a second kinematic chain.

As for the first and second embodiments, the lever 6" can be provided with an arm, a flank of which, and notably an end, which is designed to be actuated by an additional control mechanism in order to release the wheel 1" from the third wheel or from the fourth wheel, when the latter can be actuated by a connected adjustment device.

In this third embodiment, the torque which is resistive to the pivoting of the correction wheel 1" and is produced by the friction elements 61", 62", is more than 2, 3, or 5, or 6 times the torque which is resistive to the pivoting of the correction lever around the axis of rotation 6f".

The lever according to the invention or the coupling device according to the invention can be used in any type of mechanism for which a one-way coupling device is required. For example, it can be implemented in a one-way correction chain of a time or calendar indication, or any other indication derived from the time, such as the indication of the phases of the moon. It can also be used in a manual winding chain of a watch which is or is not automatic, or in an automatic winding chain of an automatic watch with one-way winding. For these winding applications, the second and third embodiments are preferred. The coupling device can be actuated, and notably the drive wheel 1, 1', 1" of this coupling device can be rotated by a control unit which can be manipulated by the wearer of the horology piece, or by the finishing chain, or by the automatic winding chain of the horology piece.

The coupling device according to the invention can also be combined with connected elements for angular blocking of the lever, independently from the direction of rotation of the drive wheel, in order thus to implement a two-way coupling device for at least one kinematic chain of a horology piece. This coupling device could co-operate with at least one lever, such as to block the spring or the lever, when the latter is situated in a predetermined angular position. An arrangement of this type is described for example in patent application EP2012199A2. This application discloses notably a lever for correction of two calendar indications, on which a correction wheel is mounted with friction. The dates correction is possible in both directions of correction by means of the co-operation of the correction lever and a correction bar, whereas the correction of the days indication is possible only in the chronological direction, because of the pivoting torque of the correction wheel. It is also conceivable to block the angular position of a correction lever of a one-way coupling device directly by means of the pull-out piece of the horological movement.

The coupling device according to the invention can also implement a lever on which there pivots more than one corrector wheel, and notably two corrector wheels. Alternatively, it can also pivot at least one additional setting wheel, which is engaged with the wheel, in order for example to invert the direction of rotation of the corrector wheel, so as to adapt to a given application.

In the different embodiments, the coupling device is arranged such that the rotation around its axis $1d$, $1d'$, $1d''$, $6f$, $6f'$, $6f''$ of the first wheel 1, 1', 1" and/or of the second wheel 2, 2', 2" involves the rotation of the lever around its axis $6f$, $6f'$, $6f''$ until the lever or one of the first and second wheel abuts an element, notably a wheel, with which the first wheel or the second wheel engages, or a stop which limits the course of rotation or of pivoting of the lever. For this purpose, as previously described, the torque which is resistive or resistant to the rotation of the first and/or of the second wheel relative to the lever, notably the sum of the torques which are resistive or resistant to the rotation of the first and the second wheel relative to the lever, must be greater than the torque which is resistive or resistant to rotation or pivoting of the lever relative to the frame of the movement. Preferably, the torque which is resistant or resistive to the rotation of the first and/or of the second wheel relative to the lever is twice as great, or three times as great, or five times as great, or six times as great, as the torque which is resistive or resistant to the pivoting of the lever around its axis of rotation or pivoting. In order to be able to be compared, the values of these torques must be brought to the level of a common axis, for example the axis of pivoting of the lever.

In the different embodiments previously described, the at least one friction element co-operates with the first shaft alone, and in particular with a cylindrical portion of the first shaft, or, more generally, with a cylindrical portion of the first wheel. However, as a variant, the at least one friction element can co-operate with the second shaft alone, or, more generally, with a cylindrical portion of the second wheel, i.e. the wheel or the shaft which is mobile in rotation around the axis around which the lever pivots. Also alternatively, a first friction element can be provided which co-operates with the first wheel, and a second friction element can be provided which co-operates with the second wheel.

In the different embodiments previously described, the portion of the first wheel with which the friction element(s) co-operate(s) is cylindrical and concentric to the wheel. However, this portion or surface can be only substantially cylindrical. Notably, it can be slightly frusto-conical and/or it can have a slightly elliptical straight cross section. In addition, the portion or surface can also be eccentric relative to the axis of rotation of the wheel.

The invention also relates to a movement 8; 8'; 8" comprising a lever, and notably a lever according to one of the embodiments previously described, or comprising a coupling device, and notably a coupling device according to one of the embodiments previously described.

Finally, the invention relates to a horology movement, and notably a watch, comprising a movement of this type.

The invention has the advantage of providing a lever with a simple structure which is easy to mount in a movement, and which additionally permits control of the friction torque applied to the coupling wheels.

By means of the invention, a friction spring is produced integrally with a coupling lever. The spring can be designed to generate a radial force on the axis of pivoting of the drive wheel.

The coupling device according to the invention permits to move in rotation the lever according to a first direction when the second wheel is moved in rotation according to the first direction and permits to move in rotation the lever according to a second direction (opposed to the first direction) when the second wheel is moved in rotation according to the second direction.

The invention claimed is:

1. Horological coupling device, comprising:
   a lever, and
   a first wheel guided in rotation in the lever,
   wherein the lever comprises:
      at least one friction element which co-operates with an at least substantially cylindrical portion of the first wheel, and
      at least one resilient element, which returns resiliently the at least one friction element to a state of co-operation with said portion of the first wheel, so as to create a resistive torque between the lever and the first wheel that opposes a rotation of the first wheel,
   wherein the coupling device is adapted to be mounted in a horology movement.

2. The coupling device according to claim 1, wherein the at least one friction element applies a resilient force on said portion of the first wheel in a radial or substantially radial direction.

3. The coupling device according to claim 1, comprising a second wheel for guiding in rotation of the lever.

4. The coupling device according to claim 1, wherein the lever comprises an opening for receipt of the first wheel.

5. The coupling device according to claim 4, wherein the at least one friction element is arranged on a flank or on a flank portion of the opening.

6. The coupling device according to claim 4, wherein the at least one resilient element comprises an arm, a flank of which coincides at least partially with a flank portion of the opening.

7. The coupling device according to claim 6, wherein the arm comprises at least one support surface for the at least one friction element.

8. The coupling device according to claim 6, wherein the lever comprises two arms, wherein ends of the arms are formed so as to permit an engagement of a shaft of the first wheel, thus permitting an engagement of the first wheel by deforming the arms resiliently.

9. The coupling device according to claim 1, wherein a support surface of the lever guiding in rotation the first wheel and the at least one friction element are combined.

10. The coupling device according to claim 1, wherein the lever is in a single piece.

11. The coupling device according to claim 1, wherein the lever comprises a body and a component which is added onto the body, the component comprising at least one of (i) the at least one friction element and the at least one resilient element and (ii) a support surface of the lever guiding in rotation the first wheel.

12. The coupling device according to claim 1, further comprising a second wheel, wherein the lever is mobile between a first lever position in which the first wheel or the second wheel is in a first position in which the first wheel or the second wheel is directly engaged with a third wheel of a first kinematic chain, and a second lever position in which the first wheel or the second wheel is in a second position in which the first wheel or the second wheel is not directly engaged with the third wheel.

13. The coupling device according to claim 12, wherein the device is configured to perform at least one of (i) correcting a calendar indication, a time indication, or an indication derived from the time, and (ii) permitting manual or automatic winding of an energy accumulator.

14. Method of coupling (i) a first wheel or a second wheel, and (ii) a third wheel, comprising:
providing the coupling device according to claim 12, and
rotating the first wheel or the second wheel so that the position of the lever is changed and so that the first wheel or the second wheel is able, according to the position of the lever, to go into the first position in which the first wheel or the second wheel is directly engaged with the third wheel, or into the second position in which the first wheel or the second is not directly engaged with the third wheel.

15. Method according to claim 14, wherein in the second position, the first wheel or the second wheel is directly engaged with a fourth wheel.

16. The coupling device according to claim 1, further comprising a second wheel, wherein the first wheel and the second wheel are connected kinematically.

17. The coupling device according to claim 1, further comprising a second wheel, wherein the coupling device is arranged such that a rotation of at least one of the first wheel and the second wheel around an axis of at least one of the first wheel and the second wheel involves a rotation of the lever around an axis of the lever until the lever or one of the first and second wheel abuts an element.

18. Movement comprising the coupling device according to claim 1.

19. Horology piece comprising the coupling device according to claim 1.

20. Watch comprising the coupling device according to claim 1.

21. The coupling device according to claim 1, further comprising a second wheel,
wherein a rotation of the first wheel or the second wheel changes a position of the lever, so that according to the position of the lever, the first wheel or the second wheel is able to go into a first position in which the first wheel or the second wheel is directly engaged with a third wheel of a first kinematic chain, or into a second position in which the first wheel or the second wheel is not directly engaged with the third wheel.

22. The coupling device according to claim 1,
wherein the lever comprises an arm that extends away from a portion of the lever, and
wherein the arm is adapted to co-operate with a control mechanism to perform at least one of (i) applying a resistive torque to the lever, and (ii) immobilizing the lever.

23. The coupling device according to claim 1, wherein the resistive torque is a clamping torque.

24. The coupling device according to claim 1,
wherein the lever is rotationally mounted on a part, and
wherein the resistive torque against the rotation of the first wheel with respect to the lever is higher than a resistive torque against a rotation of the lever about the part.

25. The coupling device according to claim 1,
wherein the lever comprises a pivot axis, and
wherein the resistive torque against the rotation of the first wheel with respect to the lever is higher than a resistive torque against a rotation of the lever about the pivot axis.

* * * * *

UNITED STATES PATENT AND TRADEMARK OFFICE
CERTIFICATE OF CORRECTION

PATENT NO. : 9,164,482 B2
APPLICATION NO. : 13/971517
DATED : October 20, 2015
INVENTOR(S) : Pierre Villaret It is certified that error appears in the above-identified patent and that said Letters Patent is hereby corrected as shown below:

In the specification

Column 3, Line 5

Change

"defined by Claims 2 to 11"

To Be

--defined by Claims 2-11 and 22-25--

Column 3, Lines 26-27

Change

"defined by Claim 12 or by Claim 13 or by Claim 14"

To Be

--defined by Claim 1--

Column 3, Lines 28-29

Change

"An embodiment of a coupling device is defined by Claim 15"

To Be

--Embodiments of a coupling device are defined by Claims 2-13, 17, and 21-25--

Signed and Sealed this
Twenty-third Day of February, 2016

Michelle K. Lee
*Director of the United States Patent and Trademark Office*

CERTIFICATE OF CORRECTION (continued)
U.S. Pat. No. 9,164,482 B2

In the specification

Column 3, Line 30

Change

"defined by Claim 16"

To Be

--defined by Claim 18--

Column 3, Line 31

Change

"defined by Claim 17"

To Be

--defined by Claim 19--